United States Patent [19]
Sakamoto

[11] Patent Number: 5,167,763
[45] Date of Patent: Dec. 1, 1992

[54] ROTATABLY-MOUNTED SPRAY DRYER

[75] Inventor: Tetsuo Sakamoto, Tokyo, Japan

[73] Assignee: Sakamoto Engineering Co., Ltd., Tokyo, Japan

[21] Appl. No.: 619,437

[22] Filed: Nov. 29, 1990

[30] Foreign Application Priority Data

Mar. 8, 1990 [JP] Japan ................. 2-24275[U]

[51] Int. Cl.⁵ .................. B01D 1/18; B01D 1/20
[52] U.S. Cl. ................... 159/4.2; 159/4.3; 159/34; 159/48.1; 159/DIG. 41; 202/83; 202/236; 202/238; 202/246
[58] Field of Search .......... 202/83, 236, 238, 246, 202/266; 203/90, DIG. 11; 159/34, 48.1, 4.2, 4.3, DIG. 41

[56] References Cited

U.S. PATENT DOCUMENTS

| | | | |
|---|---|---|---|
| 1,594,064 | 7/1926 | MacLachlan | 159/4.2 |
| 2,889,873 | 6/1959 | Sauter | 159/4.2 |
| 2,996,439 | 8/1961 | Glover | 159/4.2 |
| 3,867,234 | 2/1975 | Smith et al. | 159/4.2 |
| 3,963,559 | 6/1976 | Peterson et al. | 159/4.2 |
| 4,052,255 | 10/1977 | Hackbarth et al. | 159/4.01 |
| 4,082,221 | 4/1978 | Brummelhuis | 159/4.2 |
| 4,099,982 | 7/1978 | Hansen et al. | 159/4.2 |
| 4,363,638 | 12/1982 | Mariani | 202/83 |
| 4,488,933 | 12/1984 | Claunch et al. | 202/83 |
| 4,519,990 | 5/1985 | Bevilaqua et al. | 159/481 |
| 4,530,822 | 7/1985 | Ashley et al. | 55/230 |
| 4,584,000 | 4/1986 | Guest | 159/4.2 |
| 4,622,102 | 11/1986 | Diebel | 202/83 |
| 4,762,538 | 8/1988 | Michler et al. | 159/4.2 |

Primary Examiner—Virginia Manoharan

[57] ABSTRACT

A spray dryer which has a tank for receiving batches of differing materials to be spray dried. The tank is rotatable about a horizontal axis. The tank has an open top and a cover which is hinged on an axis perpendicular to the tank axis. The cover carries atomizer which has a shaft extending through the cover into the tank when the cover is closed. A spray disk is attached to the atomizer shaft.

5 Claims, 1 Drawing Sheet

ROTATABLY-MOUNTED SPRAY DRYER

BACKGROUND AND SUMMARY OF THE INVENTION

The present invention relates to spray dryers which are used to provide particulate or powdery materials by contacting fine droplets of a solution or slurry containing the materials with a hot fluid blast.

After a spray dryer has been used to produce particles or powders of a certain material, it is often used to produce particles or powders of a different material. However, if the spray dryer is not cleaned between these treatments, the products of the subsequent treatment can become contaminated with residual products from the prior treatment, i.e., due to previous particulate or powdery materials becoming temporarily stuck inside the tank. However, cleaning conventional spray dryers between treatments of differing materials has been a problem because such dryers are stationary secured to a base frame, and since the tank has only a product trap port in its bottom section and a small door in its one side surface which serves also as an observing window, the tank must be cleaned through the door which serves as the observing window. As such, the cleaning work is very difficult and results in the cleaning personnel becoming quite dirty. Further, the upper corner parts inside of the tank, which are at dead angles relative to the cleaning personnel, cannot be properly cleaned.

The present spray dryer has been devised in view of the above-mentioned defects inherent in conventional spray dryers so as to provide a spray dryer which facilitates the cleaning of the inside of a tank and the removal of a previous material product when the sprayer is to be used to produce a subsequent (different) material product According to the present invention, the spray dryer includes a tank having an upper end which is open and which is rotatably mounted on a base frame, and an upper cover which is attached to the tank and is movable to close the tank when in use and to open the tank (and provide access inside) when spray drying in the tank has been stopped and it has been rotated for cleaning.

Further features and advantages of the invention will be recognized by reference to the accompanying drawings, taken in conjunction with the following discussion.

DETAILED DESCRIPTION OF THE PREFERRED EMBODIMENT

Figure 1:
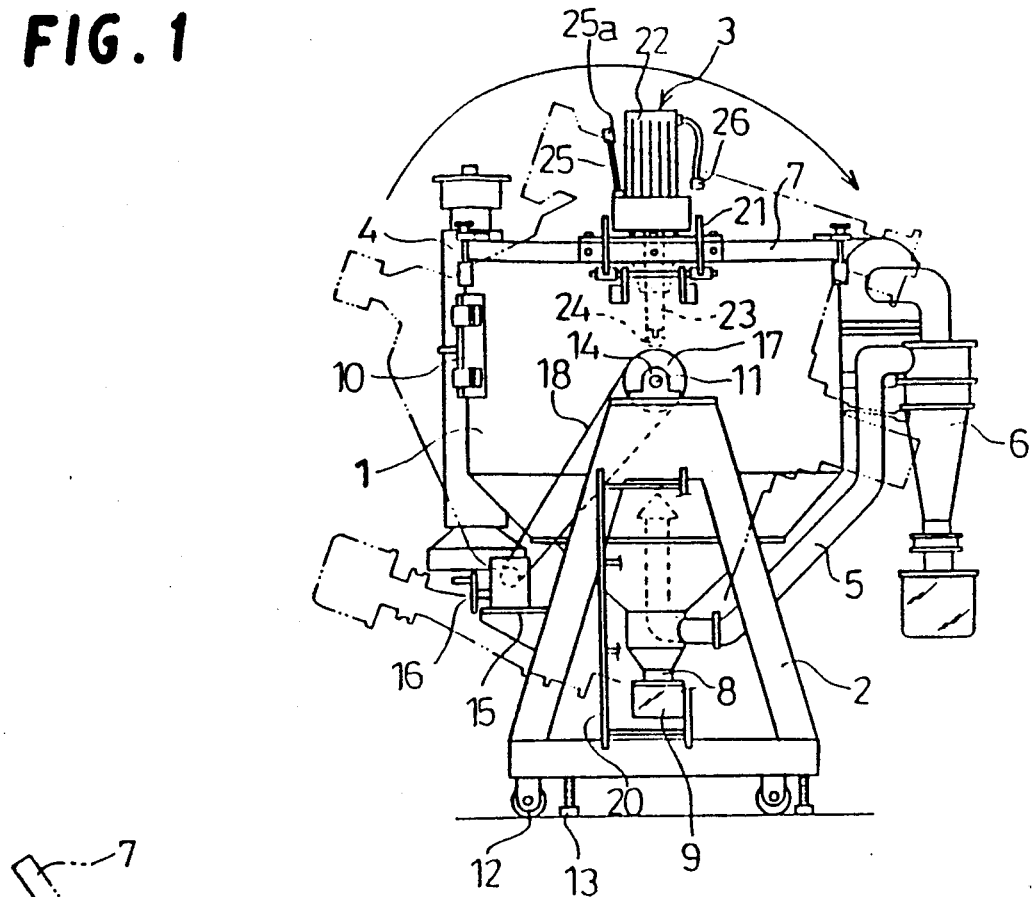
FIG. 1 shows a rear elevational view of a spray dryer in accordance with a preferred embodiment of the invention.
Figure 2:
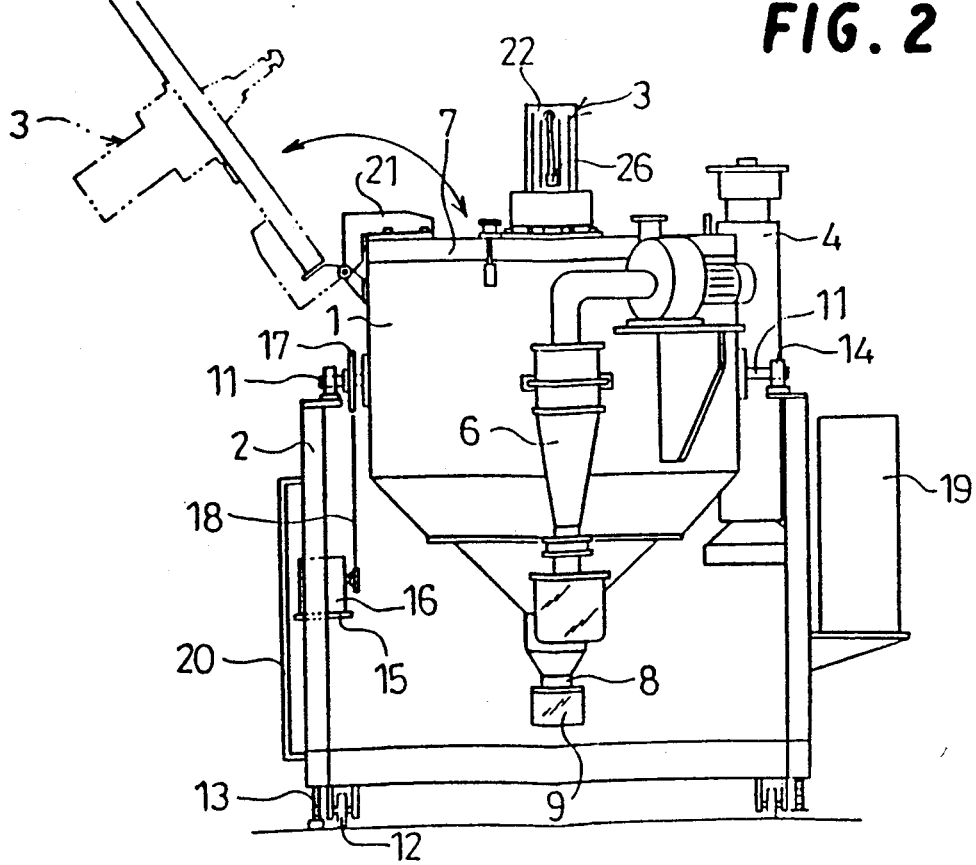
FIG. 2 shows a side elevational view thereof.

As seen in FIGS. 1 and 2, the inventive spray dryer includes a tank 1, a base frame 2 which supports the tank 1, an atomizer 3 for dispersing solution or slurry into fine droplets within the tank 1, a hot blast blower 4 for feeding hot blast into the tank 1, and a cyclone 6 connected to an air exhaust duct 5 for collecting product material floating in the tank 1. The hot blast blower 4, the air exhaust duct 5 and the cyclone 6 are supported on the tank 1.

The tank 1 is open at its upper end and is funnel-shaped towards its lower end. An upper cover 7 is connected to the tank 1 to open and close its upper end, and a trap container 9 is removably attached to a product trap port 8 at the lower end of the tank. A door 10 (which also serves as an observing window) is openably attached to one side part of the tank, and aligned support shafts 11 are integrally incorporated with and project from opposite sides of the tank. The tank is mounted on the base frame 2 via the support shafts 11 so as to be rotatable in a vertical direction (about a horizontal axis).

The base frame 2 has casters 12 so as to be freely movable on a surface, and stoppers 13 are used to fix it in a particular place. The base frame also includes bearings 14 at its upper part for rotatably journalling the support shafts 11 of the tank 1. Further, a manual or motor-driven rotary handle 16 is mounted on a frame 15, and the rotary handle 16 is coupled with a sprocket 17 attached on one of the support shafts 11 on the tank 1 by a belt or a chain 18 so that the tank 1 can be rotated vertically by means of the rotary handle 16. The base frame also supports a control panel 19 and a climbing ladder 20.

The upper cover 7 is openably coupled to the tank 1 along a hinge by means of a hinge 21. It is preferable to set the hinge 21 on the tank 1 for rotation therewith at a position above the shafts 11 in a vertical plane generally perpendicular to the horizontal axis along which the shafts 11 are mounted as shown. With this arrangement, when the tank 1 is rotated in the vertical direction as shown by the two-dot chain line in FIG. 1, the upper cover 7 can be opened and closed laterally, whereby it is possible to facilitate the holding of the upper cover 7 in its opened or closed position.

The atomizer 3 is integrally incorporated with the upper cover 7. That is, a motor 22 for the atomizer 3 is secured to the upper surface of the upper cover 7 while the rotary shaft 23 of the motor 22 extends through the upper cover 7 so that a free end thereof can be suspended inside of the tank 1, and a spray disc 24 is attached to the free end of the rotary shaft 23. Further, a liquid feed pipe 25 extends through the upper part 7 so as to confront the upper part of the spray disc 24, and is connectable at a connecting port 25a with a tube (not shown) from a liquid supply pump. The motor 22 can be operated by a power source (not shown).

With the spray dryer according to the present invention, arranged as mentioned above, when the inside of the tank is cleaned during a changing of the product to be produced, the tank is rotated vertically by about an angle of 90° to 120° so as to open the upper cover, and accordingly, the inside of the tank can be seen in its entirety, whereby it is possible for the inside of the tank to be cleaned in every nook and corner thereof, with no portions left untouched.

Further, since the upper cover can be swung away from covering the upper end of the tank, it is possible to facilitate the cleaning, maintenance and inspection of the atomizer mounted thereon.

Although a preferred embodiment of the invention has been shown and described, it is obvious that modifications therein can be made and still fall within the scope of the presented claims.

I claim:

1. A spray dryer for drying batches of differing materials comprising:
   a tank in which the batches of differing materials can be spray dried, said tank having an upper end which is open;
   a cover pivotably attached externally to said tank for opening and closing the upper end of said tank;
   an atomizer mounted on said cover, said atomizer including a shaft having a free end extending through said cover and into said tank when said cover is pivoted to close the upper end of said tank, and a spray disk mounted to the free end of said; and
   base frame means for rotatably supporting said tank about a horizontal tank axis and allowing the tank to be vertically rotated about said horizontal tank axis between batches and said cover being mounted on a hinge axis rotatable with the tank in a vertical plane generally perpendicular to the horizontal tank axis to enable the cover to be moved laterally to open the upper end of said tank, thereby providing easy access to cleaning personnel into said tank via the upper end thereof.

2. A spray dryer as defined in claim 1, wherein said tank includes two support shafts aligned with the horizontal tank axis extending away from opposite sides thereof, and wherein said base frame includes respective, horizontally aligned bearings for supporting said two support shafts.

3. A spray dryer as defined in claim 1, wherein said base includes casters to enable said base frame to be moved over a support surface.

4. A spray dryer as defined in claim 1, including a cyclone mounted on said tank for removing spray dried material therefrom.

5. A spray dryer as defined in claim 1, wherein said tank is funnel-shaped from its upper end to a lower end thereof, and wherein a trap container is connected to said lower end.

* * * * *